United States Patent Office 2,759,014
Patented Aug. 14, 1956

2,759,014

DERIVATIVES OF 9-OXO-OCTAHYDROPHENAN-
THRENE-1-CARBOXYLIC ACID

Roy H. Bible, Jr., Chicago, Ill., assignor, by mesne assignments, to G. D. Searle & Co., Skokie, Ill., a corporation of Delaware No Drawing. Application April 6, 1953, Serial No. 347,165

11 Claims. (Cl. 260—473)

The present invention relates to new derivatives of 9-oxo-octahydrophenanthrene-1-carboxylic acid containing a phenolic group in ring C and, specifically, to the compounds which are represented by the general structural formula

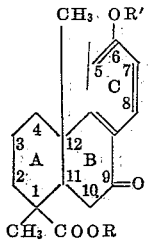

In this formula R and R' can each represent hydrogen or such lower alkyl radicals as methyl, ethyl, straight and branch chain propyl, butyl, amyl, hexyl, heptyl and octyl. Further, the radical R' can also be a radical of the type (lower alkyl)—CO— wherein the lower alkyl radical is of the type defined hereinabove.

These novel compositions of matter, are conveniently prepared from the corresponding 9-methylene compounds by oxidation, suitably with chromic acid in acetic acid.

The compounds which constitute my invention are anti-hypertensive and choleretic agents. They also provide valuable medicinials in the treatment of clinical symptoms associated with hormonal imbalance and, especially, imbalance of the gonadal hormone function. They are also valuable as intermediates in organic synthesis. Thus the 6-hydroxyl radical can be etherified or esterified to form the 6-dialkylaminoalkoxy and 6-dialkylaminoalkanoyloxy derivatives which can then be quaternized by treatment with a methohalide to form active autonomic ganglion blocking agents.

The usefulness of the compounds of my invention as intermediates in organic synthesis is enhanced by a number of properties of these molecules. The carboxy group in the 1-position is sterically hindered, which permits the ketonic group in the 9-position to be operated on independently by reagents which would normally also attack the carboxy group. For example, the addition of Grignard reagents to the ketone group can be carried out without appreciable addition to the carboxyl group. In general, the use of more vigorous reactions will permit reactions of both the ketonic and carboxylic radicals. Treatment of an alkyl ester of a 1,12-dimethyl-6-alkoxy 9-oxo-1,2,3,4,9,10,11,12-octahydrophenanthrene - 1 - carboxylic acid with hydrocyanic acid yields the alkyl ester of the 1,12-dimethyl-6-alkoxy-9-hydroxy-9-cyano-1,2,3,4,-9,10,11,12-octahydrophenanthrene-1-carboxylic acid; this compound is readily dehydrated to the 1,2,3,4,11,12-hexahydrophenanthrene derivative. Further, reduction of the nitrile radical yields the 9-aminomethyl derivative. Saponification of the 9-cyano radical yields the 9-carboxy group.

The alkyl ester of 1,12-dimethyl-6-alkoxy-9-oxo-1,2,3,-4,9,10,11,12-octahydrophenanthrene-1-carboxylic acid is converted into the 9-oxime by reaction with hydroxylamine. Reduction of this oxime with lithium aluminum hydride yields the alkyl ester of the 1,12-dimethyl--6-alkoxy-9-amino-1,2,3,4,9,10,11,12-octahydrophenanthrene - 1-carboxylic acid.

9-alkylamino derivatives are obtained by reduction with Raney nickel of an alkyl ester of a 1,12-dimethyl-6-alkoxy-9-oxo-1,2,3,4,9,10,11,12 - octahydrophenanthrene-1-carboxylic acid in the presence of an alkylamine.

Although both the 7- and 10-positions in the claimed compounds are quite reactive, these positions are usually not attacked by the same reagents. Various groups can be introduced at position 7 by the use of Friedel-Crafts type reagents. Thus the methyl ester of 1,12-dimethyl-6-methoxy-7-acetyl-9-oxo-1,2,3,4,9,10,11,12 - octahydro - phenanthrene-1-carboxylic acid is obtained by treatment of the methyl ester of 1,12-dimethyl-6-methoxy-9-oxo-1,2,3,4,9,10,11,12-octahydrophenanthrene - 1 - carboxylic acid with acetyl chloride and aluminum chloride in nitrobenzene. The 7-position can also be nitrated and sulfonated. Reduction of the 7-nitro radical yields the 7-amino compound. 1,12-dimethyl-6-methoxy-7-acetyl-9-oxo-1,2,3,4,9,10,11,12 - octahydrophenanthrene - 1 - carboxylic acid, on oxidation with sodium hypochlorite, yields 1,12-dimethyl-6-methoxy-9-oxo-1,2,3,4,9,10,11,12-octahydrophenanthrene-1,7-dicarboxylic acid.

Another property which makes the compounds of my invention especially useful as intermediates in organic synthesis is the reactivity of the 5-position. Once the more reactive 7-position has been blocked, as for example by the introduction of an acyl group by a Friedel-Crafts type reaction, various other substituents can be introduced into the 5-position. For example, nitration of the 1,12 - dimethyl-6-methoxy-7-monosuccinyl-9-oxo-1,2,3,4,9,10,11,12-octahydrophenanthrene - 1 - carboxylic acid yields the 1,12-dimethyl-5-nitro-6-methoxy-7-monosuccinyl-9-oxo-1,2,3,4,9,10,11,12-octahydrophenanthrene - 1-carboxylic acid.

Reduction of a lower alkyl ester of a 1,12-dimethyl-6-alkoxy-9-oxo-1,2,3,4,9,10,11,12 - octahydrophenanthrene-1-carboxylic acid with lithium aluminum hydride for a short time yields the lower alkyl ester of the 1,12-dimethyl-6-alkoxy-9-hydroxy-1,2,3,4,9,10,11,12 - octahydrophenanthrene-1-carboxylic acid; on more prolonged reduction under the same conditions it yields the 1,12-dimethyl-6-alkoxy-9-hydroxy-1-methanol.

While the foregoing chemical reactions furnish valuable phenanthrene compounds, the claimed compositions also have a special field of utility in the synthesis of steroids. Thus compounds of the structural formula shown hereinabove, wherein R and R' are lower alkyl radicals, when subjected to a Friedel-Crafts reaction with acrylyl chloride using aluminum chloride as catalyst and nitrobenzene as solvent, yield steroids such as 4-methyl- 4-carbethoxy - 12-methoxy-18-nor-Δ⁸,¹¹,¹³-androstatriene-7,17-dione according to the following structural formulae

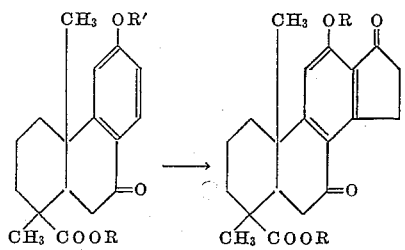

My invention is disclosed in further detail by the following examples which are set forth for the purpose of illustrating this invention, but are in no way to be construed as limiting it in spirit or in scope. It will be apparent to those skilled in the art of organic synthesis that many conventional modifications in methods, conditions and materials can be adopted without departing therefrom. In each of these examples quantities of materials are indicated as parts by weight and temperatures are given uncorrected in degrees centigrade (° C.).

*Example 1*

A solution of 100 parts of methyl O-methylpodocarpate in 1050 parts of hot glacial acetic acid is stirred and cooled to 17° C. and treated at that temperature, by slow addition, with 72 parts of chromic anhydride in 166 parts of 80% acetic acid in the course of 30 minutes. Stirring is continued for another 10 minutes after which the mixture is stored at 5° C. for 3 days and then at room temperature for 2 days. It is then poured with stirring into 1000 parts of ice cold water and extracted with ether. The ether extract is washed with 10% aqueous sodium hydroxide until the washings are no longer colored and then with water to neutrality. The washed ether solution is dried over anhydrous calcium sulfate, filtered and stripped of solvent under vacuum. The slightly yellow solid residue is recrystallized twice from aqueous ethanol to yield clusters of beautiful white prisms melting at about 122–124° C. A 1% solution in absolute alcohol gives a specific optical rotation $[\alpha]_D^{20} = +124°$. The infrared spectrum exhibits strong bands at 5.82, 6.02, 6.28, 6.39, and 6.76 microns. The ultraviolet spectrum shows a peak at 227 millimicrons with a molecular extinction coefficient of 13,000 and a peak at 276 millimicrons with an extinction coefficient of 15,800. The methyl ester of 1,12-dimethyl - 6 - methoxy - 9 - oxo - 1,2,3,4,9,10,11,12-octahydrophenanthrene-1-carboxylic acid has the structural formula

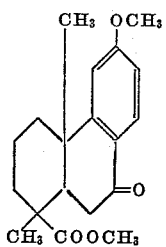

*Example 2*

A solution of 4 parts of 2,4-dinitrophenylhydrazine in a mixture of 28 parts of concentrated sulfuric acid, 30 parts of water and 79 parts of 95% ethanol is added to a solution of 5 parts of the methyl ester of 1,12-dimethyl-6-methoxy - 9 - oxo - 1,2,3,4,9,10,11,12 - octahydrophenanthrene-1-carboxylic acid in 160 parts of 95% ethanol. The entire mixture gels almost immediately. The solid is collected on a filter and recrystallized from a mixture of ethanol and ethyl acetate. The 2,4-dinitrophenylhydrazone of the methyl ester of 1,12-dimethyl-6-methoxy-9-oxo - 1,2,3,4,9,10,11,12 - octahydrophenanthrene - 1 - carboxylic acid is thus obtained in well-defined, orange crystals melting at about 221–223° C. The infrared absorption spectrum shows bands at 3.0, 5.61 and 7.5 microns. The ultraviolet absorption spectrum shows peaks at 226, 294 and 395 millimicrons and a shoulder at 260 millimicrons.

*Example 3*

A solution of 10 parts of the methyl ester of 1,12-dimethyl - 6 - methoxy - 9 - oxo - 1,2,3,4,9,10,11,12 - octahydrophenanthrene-1-carboxylic acid in 142 parts of 95% ethanol is added to a solution of 25 parts of hydroxylamine hydrochloride in 150 parts of water and 100 parts of 10% sodium hydroxide. The mixture is heated to boiling and ethanol is added until the boiling solution is clear. Boiling is continued for 10 more minutes after which the mixture is allowed to stand for 24 hours. The precipitate is collected on a filter and then recrystallized from a mixture of ethanol and water. The oxime of the methyl ester of 1,12-dimethyl-6-methoxy-9-oxo-1,2,3,4,9,10,11,12 - octahydrophenanthrene - 1 - carboxylic acid crystallizes in irregular platelets which melt at 176.5–178.5° C. The ultraviolet absorption spectrum of this oxime has a peak at 268 millimicrons with a molecular extinction coefficient of 15,700. The infrared absorption spectrum has a sharp, strong band at 2.78 microns and a broader band of less intensity at 3.02 microns.

*Example 4*

A solution of 90 parts of O-methylpodocarpic acid and 1070 parts of glacial acetic acid is stirred and maintained at 15–18° C. while a solution of 65.4 parts of chromic acid in a mixture of 32 parts of water and 134 parts of glacial acetic acid is added in the course of 30 minutes. The reaction mixture is stirred at 5–10° C. and then stored at 8–10° C. for 3 days. After further storage at room temperature for 2 days, 40 parts of 95% ethanol are added slowly with good mixing in order to decompose any unreacted chromic anhydride. The entire reaction mixture is stirred into 3000 parts of warm water and then extracted exhaustively with ether. The combined ether extracts are washed with dilute hydrochloric acid until the washings are no longer colored and then with water to neutrality. The solution is dried over anhydrous sodium sulfate, filtered and concentrated in vacuo to yield a light yellow, viscous oil. The product is decolorized by boiling a methanolic solution with activated charcoal. The 1,12 - dimethyl - 6 - methoxy - 9 - oxo - 1,2,3,4,9,10,-11, 12-octahydrophenanthrene-1-carboxylic acid crystallizes from aqueous methanol in small, colorless, gleaming prisms which melt at about 183–185° C. The infrared spectrum shows well-defined bands at 2.83, 5.90, 5.98, 6.27 and 7.82 microns. The ultraviolet absorption spectrum has peaks at 226 and 276 millimicrons with molecular extinction coefficients of 13,600 and 15,700, respectively. The compound has the structural formula

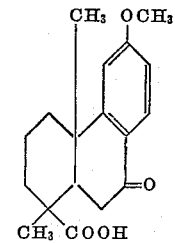

*Example 5*

40 parts of 1,12-dimethyl-6-methoxy-9-oxo-1,2,3,4,9,-10,11,12 - octahydrophenanthrene - 1 - carboxylic acid are mixed with 160 parts of freshly distilled pyridine hydrochloride. The mixture is refluxed under anhydrous conditions for 30 minutes, cooled and triturated with a large volume of water. The white solid is collected on a filter and washed repeatedly with warm water. Two recrystallizations from aqueous methanol yield the pure 1,12 - dimethyl - 6 - hydroxy - 9 - oxo - 1,2,3,4,9,10,11,12-octahydrophenanthrene-1-carboxylic acid in the form of short, shining needles melting at about 296–298° C. The specific rotation of an ethanolic solution is $$[\alpha]_D^{25} = +87.5°$$

The ultraviolet absorption spectrum shows a maximum at 228 millimicrons with a molecular extinction coefficeint of 12,300 and at 281 millimicrons with a coefficient of 14,400. This compound has the structural formula

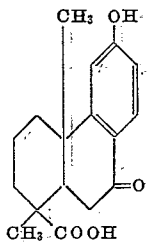

*Example 6*

A stirred solution of 103 parts of ethyl O-ethylpodocarpate in 1000 parts of hot glacial acetic acid is cooled to 15° C. and treated at that temperature with 69 parts of chromic anhydride in 158 parts of 80% acetic acid in the course of 30 minutes. Stirring is continued for a few more minutes after which the mixture is maintained at 10° C. for 2 days and then at room temperature for 2 days. It is then poured, with stirring, into 1000 parts of ice and water and extracted with ether. This extract is washed with 10% aqueous potassium hydroxide until the washings are colorless and then with water to neutrality. The ether solution is dried over anhydrous calcium sulfate, filtered and concentrated in vacuo. The lemon-colored ethyl ester of 1,12-dimethyl-6-ethoxy-9-oxo - 1,2,3,4,9,10,11,12 - octahydrophenanthrene - 1 - carboxylic acid shows ultraviolet absorption maxima at 227 and 280 millimicrons with molecular extinction coefficients of about 14,400 and 17,300 respectively. The infrared absorption spectrum shows maxima at 5.81, 6.0, 6.28, 6.40 and 7.75 microns. The compound has the structural formula

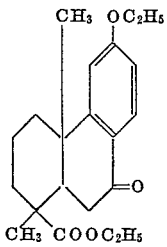

*Example 7*

A stirred solution of 226 parts of 1,12-dimethyl-6-butyryloxy - 1,2,3,4,9,10,11,12 - octahydrophenanthrene - 1-carboxylic acid in 2100 parts of hot glacial acetic acid is cooled to 15° C. and treated at that temperature by the gradual addition of 144 parts of chromic anhydride in 332 parts of 80% acetic acid with stirring in the course of 45 minutes. Stirring is continued for an additional 15 minutes after which the mixture is stored at 10° C. for a day and then at 25° C. for two days. It is then poured, with stirring, into 2000 parts of a mixture of ice and water and extracted with ether. The ether extracts are washed with water, dried over anhydrous calcium sulfate, filtered and solvent stripped to yield the slightly yellow 1,12 - dimethyl-6-butyryloxy-9-oxo-1,2,3,4,9,10,-11,12-octahydrophenanthrene-1-carboxylic acid. The infrared absorption spectrum shows maxima at 5.72, 5.9, 5.99, 6.27 and 7.82 microns. The compound has the structural formula

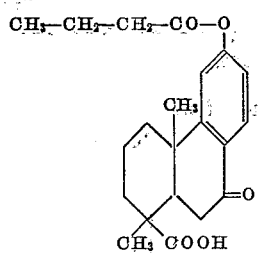

*Example 8*

100 parts of the ethyl ester of 1,12-dimethyl-6-acetoxy-1,2,3,4,9,10,11,12 - octahydrophenanthrene - 1 - carboxylic acid in 1200 parts of hot glacial acetic acid is cooled to 15° C. and treated at that temperature with stirring by the gradual addition of 64 parts of chromic anhydride in 147 parts of 80% acetic acid in the course of 40 minutes. Stirring is continued for an additional half hour, after which the mixture is permitted to stand at 10° C. for 3 days. It is then poured with stirring into 1000 parts of ice water, and extracted with ether. This ether extract is washed thoroughly with dilute ammonium hydroxide and then with water to neutrality. The ether solution is then dried over anhydrous calcium sulfate, stirred with charcoal, filtered and evaporated to yield the ethyl ester of 1,12 - dimethyl - 6 - acetoxy - 9 - oxo-1,2,3,4,9,10,11,12 - octahydrophenanthrene - 1 - carboxylic acid as a slightly yellowish solid. The infrared absorption spectrum shows maxima at 5.8, 6.0, 6.28, 6.4 and 7.78 microns. The compound has the structural formula

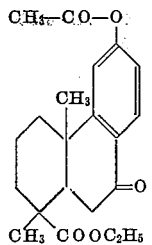

*Example 9*

A solution of 15 parts of lithium aluminum hydride in 390 parts of anhydrous ether is treated in the course of 15 minutes, with efficient stirring, with a solution of 40 parts of the methyl ester of 1,12-dimethyl-6-methoxy-9-oxo - 1,2,3,4,9,10,11,12 - octahydrophenanthrene - 1 - carboxylic acid and 130 parts of benzene. The resulting mixture is stirred at reflux temperature for 90 hours. During this reflux period 170 parts of benzene are added. The excess lithium aluminum hydride is decomposed by the addition of ethyl acetate after which water is added with stirring until a pasty precipitate forms. The clear ethereal layer is separated and the precipitate is extracted with ether. The combined ether solutions are shaken with small parts of 10% aqueous sodium hydroxide. The ether solution is then washed with water to neutrality, dried over anhydrous calcium sulfate, filtered and evaporated in vacuo. Recrystallization of the viscous residue from cyclohexane yields the 1-hydroxymethyl-1,12-dimethyl - 6 - methoxy - 1,2,3,4,9,10,11,12-octahydro - 9-phenanthrol as a white powder. The infrared absorption spectrum shows strong absorption bands at 2.77, 8.05 and 9.6 microns but no appreciable absorption between 5.7 and 6.1 microns.

*Example 10*

The methyl ester of 1,12-dimethyl-6-methoxy-9-oxo-1,2,3,4,9,10,11,12-octahydrophenanthrene - 1 - carboxylic acid is reduced with lithium aluminum hydride in the same way as in the preceding example except that the reflux period is shortened to 30 minutes. Isolation by the same procedure yields the methyl ester of the 1,12-dimethyl - 6 - methoxy-9-hydroxy-1,2,3,4,9,10,11,12-octahydrophenanthrene-1-carboxylic acid as a white powder. The infrared absorption spectrum shows strong absorption at 2.78 and 5.8 microns.

I claim:

1. A compound of the structural formula

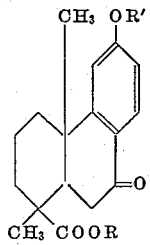

wherein R is a member of the class consisting of hydrogen and lower alkyl radicals and R' is a member of the class consisting of hydrogen, lower alkyl and (lower alkyl)-CO-radicals.

2. 1,12 - dimethyl - 6-hydroxy-9-oxo-1,2,3,4,9,10,11,12-octahydrophenanthrene-1-carboxylic acid.

3. A 1,12-dimethyl-6-(lower alkyloxy)-9-oxo-1,2,3,4,9,10,11,12-octahydrophenanthrene-1-carboxylic acid.

4. 1,12 - dimethyl-6-methoxy-9-oxo-1,2,3,4,9,10,11,12-octahydrophenanthrene-1-carboxylic acid.

5. A lower alkyl ester of a 1,12-dimethyl-6-(lower alkyloxy) -9-oxo-1,2,3,4,9,10,11,12-octahydrophenanthrene-1-carboxylic acid.

6. A lower alkyl ester of 1,12-dimethyl-6-methoxy-9-oxo - 1,2,3,4,9,10,11,12-octahydrophenanthrene-1-carboxylic acid.

7. The methyl ester of 1,12-dimethyl-6-methoxy-9-oxo-1,2,3,4,9,10,11,12 - octahydrophenanthrene - 1 - carboxylic acid.

8. A compound of the structural formula

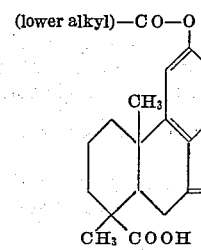

9. 1,12 - dimethyl - 6-acetoxy-9-oxo-1,2,3,4,9,10,11,12-octahydrophenanthrene-1-carboxylic acid.

10. A compound of the structural formula

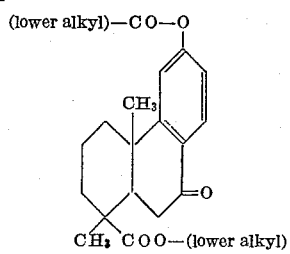

11. A lower alkyl ester of 1,12-dimethyl-6-acetoxy-9-oxo - 1,2,3,4,9,10,11,12-octahydrophenanthrene-1-carboxylic acid.

References Cited in the file of this patent
UNITED STATES PATENTS 2,656,345  Jacobsen _____ Oct. 20, 1953

OTHER REFERENCES

Zeiss: Chem. Review, v. 42 (1948), pp. 175–176.